(No Model.)
C. F. LEOPOLD.
MEAT CUTTER.
No. 348,132. Patented Aug. 24, 1886.
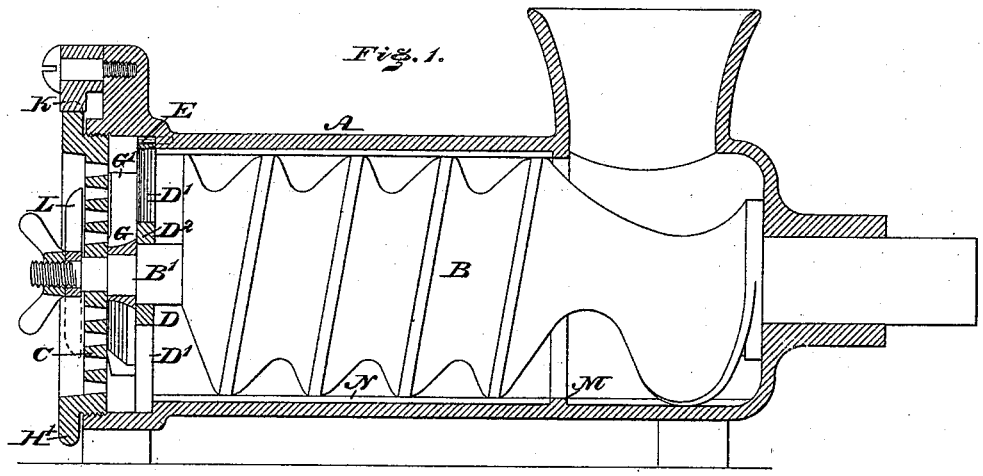
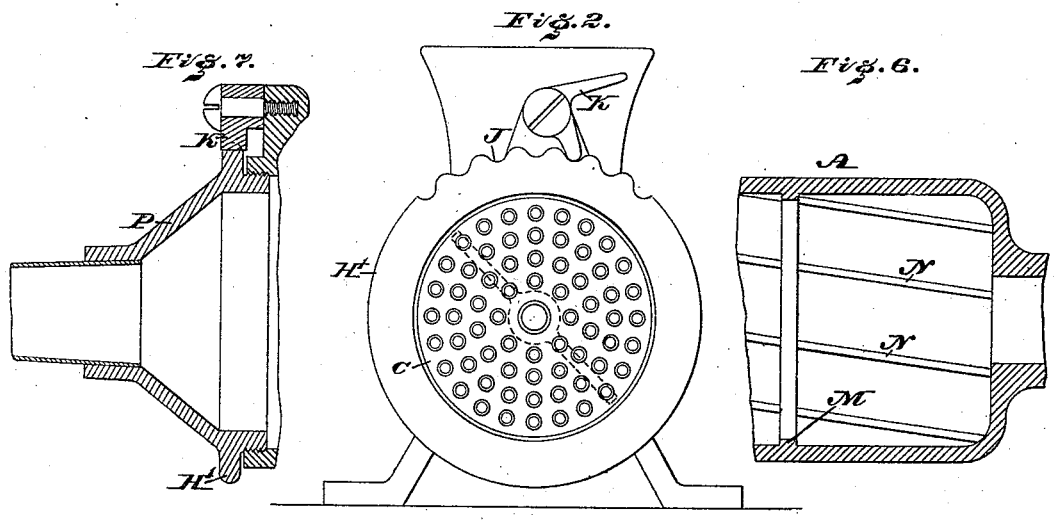
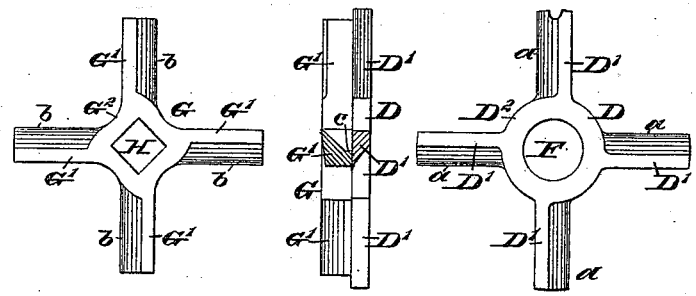
WITNESSES:
Th. Rolle
W. F. Kircher
INVENTOR
Charles F. Leopold
BY John A. Wiedersheim
ATTORNEY.

UNITED STATES PATENT OFFICE.

CHARLES F. LEOPOLD, OF PHILADELPHIA, PENNSYLVANIA, ASSIGNOR TO THE AMERICAN MANUFACTURING COMPANY, OF SAME PLACE.

MEAT-CUTTER.

SPECIFICATION forming part of Letters Patent No. 348,132, dated August 24, 1886.

Application filed April 15, 1886. Serial No. 198,892. (No model.)

*To all whom it may concern:*

Be it known that I, CHARLES F. LEOPOLD, a citizen of the United States, residing in the city and county of Philadelphia, State of Pennsylvania, have invented a new and useful Improvement in Meat-Cutters, which improvement is fully set forth in the following specification and accompanying drawings, in which—

Figure 1 represents a longitudinal section of a meat-cutter embodying my invention; Fig. 2, an end view thereof; Figs. 3 and 4, views of the rotary and stationary cutters; Fig. 5, a section of the two cutters. Fig. 6 represents a horizontal section of a portion of the casing; and Fig. 7 represents a view of a portion of a spout for a stuffer applicable to the casing of the meat-cutter.

Similar letters of reference indicate corresponding parts in the several figures.

My invention consists of a meat-cutter having stationary and rotary cutters so located and combined as to effect a double cutting action.

It also consists of the casing provided with a forcing-screw, and formed with a circumferential rib and spiral ribs.

It further consists of the casing having a forcing-screw and formed with a screw-thread and a shoulder, and containing stationary cutters and a rotary cutter, the latter being interposed between the stationary cutters.

It also consists of a meat-cutter having a detachable perforated disk having a toothed rim, and the casing provided with a pawl which engages with said rim for locking the disk.

Referring to the drawings, A represents the casing of a meat-cutter, the same being of a cylindrical form and containing the forcing-screw B, which has one of its journal-bearings in one end of the casing, and the other in a perforated disk, C, the latter being screwed to said casing on the interior of the same.

D represents a stationary cutter, which consists of blades D' radiating from a hub, D², said blades resting against a shoulder, E, on the inner face of the casing, and having cutting-edges $a$, and said hub having a circular opening, F, through which the shaft B' of the screw B is freely passed.

Interposed between the cutter D and the disk C is a rotary cutter, G, which consists of blades G' radiating from a hub, G², said blades having cutting-edges $b$ on opposite sides. The hub G² has a squared or angular opening, H, to receive a similar shaped portion of the shaft B', whereby the said cutter G rotates with the screw.

The disk C has a rim, H', whereby it may be readily screwed and unscrewed, and is serrated, corrugated, or otherwise toothed, as at J, for engagement of a dog or pawl, K, which is pivoted to the casing A. It will be seen that when the disk is screwed into the casing the pawl K engages with one of the teeth J, and prevents unscrewing of said disk, whereby it is reliably retained in position. When removal of the disk is required the pawl is raised, whereby it clears the tooth and the disk may then be unscrewed.

The operation of the cutter is as follows: When meat is supplied to the casing, it is forced by the screw successively through the stationary cutter, the rotary cutter, and the disk, it being cut, first, between the cutter-edges $a$ of the stationary cutter and backs $c$ of the blades of the rotary cutter, and, next, between the cutting-edges $b$ of the rotary cutter and the inner face of the disk, the latter acting as a bed or stationary cutter, and, finally, escapes through the perforations of the disk C in streams, which drop from the outer face of the disk and readily disintegrate. A wiper, L, is fastened to the outer end of the stem B' of the screw, for cleaning the disk of the streams of meat and assist in the disintegration thereof. As the meat is subjected to two cutting actions, the cutting or mincing of the meat is effectually accomplished.

The rotary and stationary cutters may be readily removed where dull or broken by unscrewing the disk C, it being noticed that when said cutters are in position the screw-shaft B' passes through the same, and it is supported on the stationary cutter as well as on the disk, and thus firmly sustained.

On the inner face of the casing is a rib, M, which extends transversely or circumferentially, and ribs N, forming corrugations, which extend spirally or diagonally, the rib M being located at or near the place of junction of the inlet portion of the casing with the main body of said casing, it being seen that the screw comes in contact with said rib M, whereby the meat is primarily cut and prevented from packing in the inlet portion of the casing, and then directed into the main body of the casing, where it may expand into the corrugations or channels formed by the ribs N, preventing clogging in the main body.

For stuffing purposes the disk C is removed, and in lieu thereof I employ a conical cap, P, which is provided with a spout, and has a threaded periphery, whereby it may be screwed to the casing, and a corrugated or toothed rim, whereby it may be engaged and held by the dog or pawl K.

Having thus described my invention, what I claim as new, and desire to secure by Letters Patent, is—

1. A meat-cutter having a forcing-screw, rotary cutter, and stationary cutters, the rotary cutter being located between the stationary cutters, and formed of a blade having double cutting-edges, said edges being on opposite sides of the blade, substantially as described.

2. A meat-cutter having a casing provided with a forcing-screw, and formed with an inner circumferential rib, M, and spiral ribs N, substantially as described.

3. A meat-cutter having a casing, which is provided with a forcing-screw, and formed on its interior at the end with a screw-thread and near the end with a shoulder, a stationary cutter resting against said shoulder, a perforated disk engaging with said thread, and a rotary cutter, which is interposed between said stationary cutter and disk in contact therewith, and formed of a blade having cutting-edges on opposite sides, substantially as stated.

4. In a meat-cutter, the casing A, having inner ribs, in combination with a forcing-screw, a fixed cutter, a rotary cutter, the cutting-edges of the knives of the cutters being in opposite directions, a detachable perforated disk, and a locking device for said disk, all substantially as described.

5. A meat-cutter having a detachable perforated disk, provided with a rim having its periphery toothed, and its casing provided with a pawl adapted to engage the said notched rim, substantially as described.

6. The casing A, having circumferential rib M, spiral ribs N, and shoulder E, in combination with forcing-screw B, stationary cutter D, rotary cutter G, perforated disk C, with flange H', having its periphery toothed, pawl K, and wiper L, all substantially as and for the purpose set forth.

CHAS. F. LEOPOLD.

Witnesses:
JOHN A. WIEDERSHEIM,
A. P. GRANT.